UNITED STATES PATENT OFFICE.

RAYMOND F. BACON, OF PITTSBURGH, PENNSYLVANIA, ASSIGNOR TO METALS RESEARCH COMPANY, OF NEW YORK, N. Y., A CORPORATION OF MAINE.

PRODUCTION OF HYDROGEN SULFID.

1,235,953.

Specification of Letters Patent.　　Patented Aug. 7, 1917.

No Drawing.　　Application filed November 10, 1915.　Serial No. 60,698.

*To all whom it may concern:*

Be it known that I, RAYMOND FOSS BACON, a citizen of the United States, residing at No. 4909 Forbes street, Pittsburgh, Allegheny county, State of Pennsylvania, have invented certain new and useful Improvements in Production of Hydrogen Sulfid; and I do hereby declare the following to be a full, clear, and exact description of the invention, such as will enable others skilled in the art to which it appertains to make and use the same.

For the separation, by flotation, of oxidized ores (say copper oxids and copper carbonates) from their associated gangue, it has heretofore been proposed to subject the ore to the sulfidizing action of a body of water containing, in solution, hydrogen sulfid. The action of the hydrogen sulfid upon the fine particles of oxidized ore is to convert them superficially, to a greater or less depth into copper sulfid, the coating or film of sulfid thus produced sufficing to render the ore particles amenable to flotation by processes well known in the art.

The present invention has for its purpose to make available, in the production of the sulfidizing solution, material readily available in mining regions, where the flotation plants are located and which are usually remote from ordinary centers of industry and supply.

In the practice of the invention, I make use of such readily available sulfid ores and concentrates as iron pyrites, copper pyrites, flotation concentrates, chalcopyrites, and the like and, in conjunction therewith, as will hereinafter more fully appear, I employ lime, all of these materials being readily obtainable in sufficient amounts, as natural products, in ordinary mining regions, or in their near vicinity.

It is well known that upon passing steam, under proper conditions of temperature, through sulfur-bearing materials, a reaction takes place which results in the formation of relatively small amounts of hydrogen sulfid. I have discovered, however, that by adding to the charge a relatively small quantity, *e. g.* 1% or more of an alkaline substance, (preferably lime), it is possible to largely increase the yield of hydrogen sulfid and to obtain substantially all, for example, 80 to 90% or more, of the sulfur in the form of hydrogen sulfid from a charge containing a given amount of sulfur-bearing materials. In the operation, the lime apparently subserves the role of a catalytic agent, in the sense that, although it increases the rate and completeness of the reactions resulting in the production of the hydrogen sulfid, it nevertheless appears in its substantial entirety in the solid residue of the furnace operation.

In the practice of the invention, I first crush and then grind to a fine powder a mixture of the lime with any one or more of the sulfid ores or concentrates which form the sources of the available sulfur. The mixture thus obtained is then placed in an iron tube or retort, externally heated to a temperature beginning at 300° C. and eventually rising to 700° C. Steam, superheated to prevent it from exercising an excessive chilling effect upon the charge is then passed through the tube.

The reaction resulting in the production of the hydrogen sulfid becomes fairly vigorous at 300° C., and the temperature is raised gradually up to 700° C., or thereabouts, so as to speed up the operation and to evolve practically all of the hydrogen sulfid available.

On its issuance from the reaction tube or muffle, the hydrogen sulfid may be absorbed directly, and while still highly heated, or after cooling, in the water which is to serve as the sulfidizing solution for the oxidized ore; so that the operator will have at his immediate disposal a solution appropriate for use in preparing the ore for separation by flotation. An excess of hydrogen sulfid over the amount required for forming the desired surface film of copper sulfid upon the oxidized ore particles is to be avoided, as far as possible, or neutralized in the sulfidizing vessel, at the conclusion of the filming operation before the ore is passed on to the flotation tank; otherwise any excess of hydrogen sulfid will interfere with the efficacy of the flotation of the particles.

What I claim is:

1. The method of producing hydrogen sulfid from sulfid ores and concentrates, which comprises passing steam into contact with a mixture of such sulfids and lime at a temperature sufficient to effect the reaction and evolution of the hydrogen sulfid; substantially as described.

2. The method of producing hydrogen sulfid from sulfid ores and concentrates, which comprises passing steam into contact with a mixture of such sulfids with a small quantity of lime, at a temperature sufficient to effect the re-action and evolution of the hydrogen sulfid and gradually raising the temperature up to about 700°; substantially as described.

In testimony whereof I affix my signature.

RAYMOND F. BACON.